(12) United States Patent
Oshima et al.

(10) Patent No.: US 7,336,408 B2
(45) Date of Patent: Feb. 26, 2008

(54) REFLECTING MIRROR SUPPORTING MECHANISM

(75) Inventors: Takeharu Oshima, Tokyo (JP); Noboru Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 53 days.

(21) Appl. No.: 10/581,888

(22) PCT Filed: Aug. 20, 2004

(86) PCT No.: PCT/JP2004/011961

§ 371 (c)(1), (2), (4) Date: Jun. 6, 2006

(87) PCT Pub. No.: WO2006/018888

PCT Pub. Date: Feb. 23, 2006

(65) Prior Publication Data

US 2007/0097473 A1    May 3, 2007

(51) Int. Cl.
   *G02B 26/08* (2006.01)
(52) U.S. Cl. ...................... 359/224; 359/872
(58) Field of Classification Search ............... 359/196, 359/223–226, 871, 872
   See application file for complete search history.

(56) References Cited

U.S. PATENT DOCUMENTS 5,545,040 A    8/1996  Lu 5,969,892 A *  10/1999  Slusher ..................... 359/872
2002/0089766 A1*  7/2002  Moeller et al. ............. 359/811

FOREIGN PATENT DOCUMENTS

| EP | 1 376 183 | 1/2004 |
| JP | 6-118295 | 4/1994 |
| JP | 2000-338430 | 12/2000 |
| WO | 99/38044 | 7/1999 |

* cited by examiner

Primary Examiner—Euncha P. Cherry
(74) Attorney, Agent, or Firm—Oblon, Spivak, McClelland, Maier & Neustadt, P.C.

(57) ABSTRACT

In a reflecting-mirror supporting mechanism, elastic rotation about the lateral X axis is made possible by providing first spring elements 2 and second spring elements 3 in a bipod 1. In addition, elastic rotation about the lateral Y axis is made possible by a spring member 6, and elastically translational displacement along the axial Z axis is made possible by a parallel-spring member 9. The two legs of the bipod 1 are arranged with their upper ends getting close to each other with a predetermined distance at a tilt with respect to the axial Z axis. Variations in moment load generated in the reflecting mirror can be suppressed by making the intersecting point of the center axes of the two legs of the bipod 1 agree with the position of the center of gravity of the reflecting mirror.

3 Claims, 5 Drawing Sheets

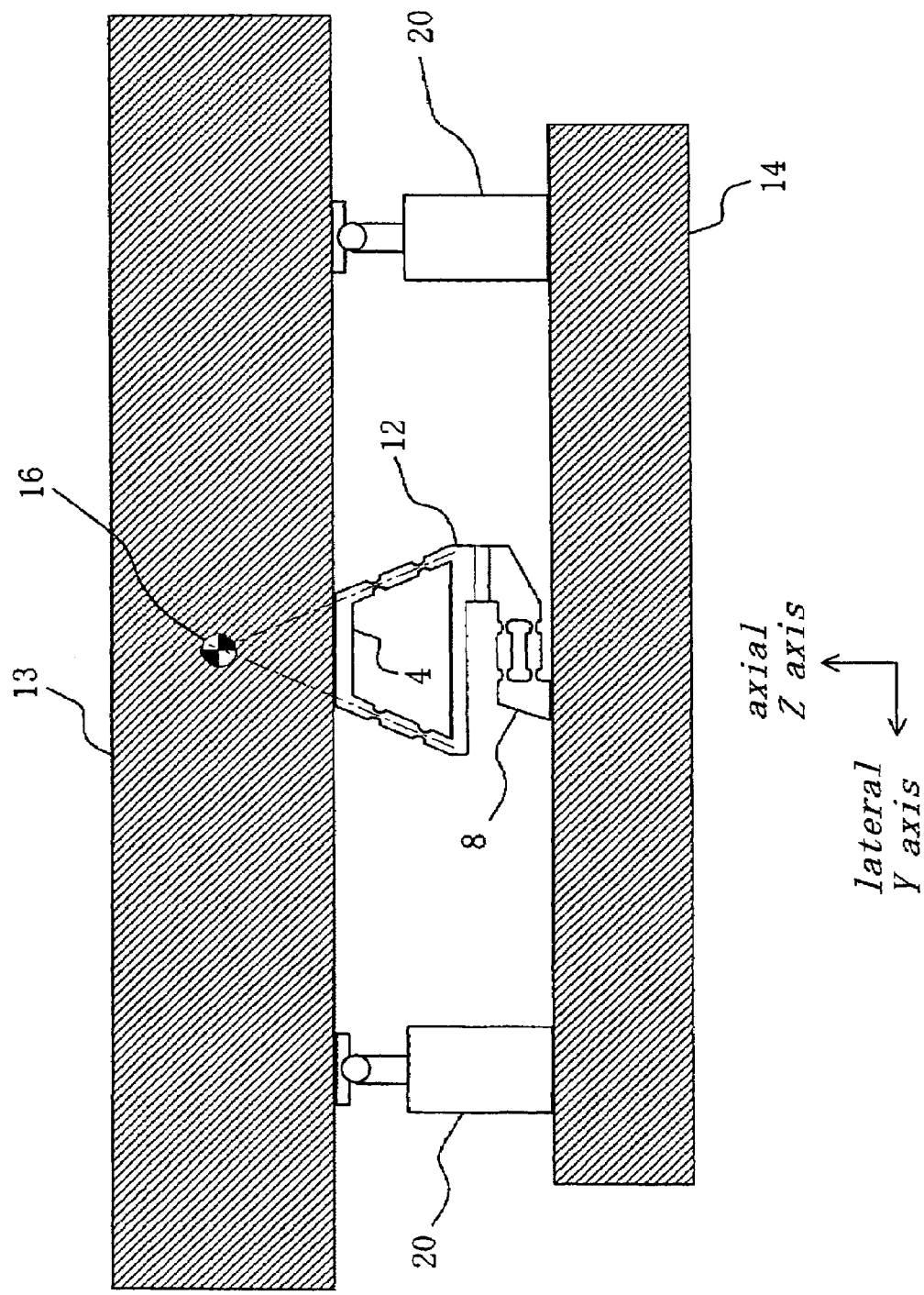

REFLECTING MIRROR SUPPORTING MECHANISM

TECHNICAL FIELD

The present invention relates to reflecting-mirror supporting mechanisms for supporting the surface of a reflecting mirror with a high accuracy, which are used for large telescopes for performing astronomical observations by receiving observation light, millimeter waves, or sub-millimeter waves from celestial bodies.

BACKGROUND ART

In order to perform observations with a higher resolution and a higher accuracy, telescope systems for performing astronomical observations by receiving observation light or radio waves from the space are getting larger and larger in recent years. In particular, the reflecting mirror unit in the telescope systems, whose aperture diameter is several meters to several tens of meters, has been considered, so that it has been necessary to more accurately support the reflecting mirror. For example, in Japanese Patent Application Laid-Open No. 118295/1994, a conventional reflecting-mirror supporting mechanism is described. In the reflecting-mirror supporting mechanism disclosed in Japanese Patent Laid-Open No. 118295/1994, a hole for fixing a supporting mechanism is provided in the reflecting mirror, and the point at which the reflecting mirror is supported by the supporting mechanism is located in the position of the center of gravity of the reflecting mirror. Thus, by supporting the reflecting mirror at the position of the center of gravity, moment load due to the displacement between the supporting point and the reflecting-mirror gravity center position is prevented from arising. Therefore, variations in the moment load, which arises from bearing change of the reflecting mirror such as change in the elevation angle, can be prevented, so that generation of stress in the reflecting mirror and change in shape of the reflecting mirror can be prevented.

In the conventional reflecting-mirror supporting mechanism, in order to support the position of the center of gravity of the reflecting mirror, the hole for fixing the supporting mechanism is formed in the reflecting mirror. However, there has been a problem in that milling for forming a hole in the base material of the reflecting mirror must be performed for each supporting point, so that machining man-hours increase, and the number of days required for the machining resultantly increases. In particular, the larger the aperture diameter of the reflecting mirror, the thicker the thickness of the base material of the reflecting mirror in order to ensure the rigidity. Therefore, it sometimes has taken about one year to perform machining of the supporting-mechanism fixing holes.

[Patent document 1] Japanese Patent Laid-Open No. 118295/1994

DISCLOSURE OF THE INVENTION

[Problem that the Invention is to Solve]

The present invention has been made to resolve the above-described problem, and aims to achieve a reflecting-mirror supporting mechanism for supporting a reflecting mirror, without forming holes for fixing supporting mechanisms, while maintaining high mirror accuracy of the reflecting mirror, with bearing force acting on the position of the center of gravity of the reflecting mirror, and a reflecting-mirror positioning mechanism using the reflecting-mirror supporting mechanism.

[Means for Solving the Problem]

A reflecting-mirror supporting mechanism according to claim 1 of the invention includes: a bipod whose mirror-mounting portion onto which a reflecting mirror is mounted rotates elastically about the lateral X axis, and the center axes of the two legs of which intersect at the position of the center of gravity of the reflecting mirror along its optical axis; a spring member for enabling elastic rotation of the bipod about the lateral Y axis; and a parallel-spring member for enabling elastically translational displacement of the bipod along the optical axis of the reflecting mirror.

A reflecting-mirror supporting mechanism according to claim 2 of the invention is configured so that, in the reflecting-mirror supporting mechanism according to claim 1 of the invention, each of the two legs of the bipod includes a first spring element and a second spring element, formed by providing grooves in each leg.

A reflecting-mirror supporting mechanism according to claim 3 of the invention includes: a bipod whose mirror-mounting portion onto which a reflecting mirror is mounted rotates elastically about the lateral X axis and about the lateral Y axis, and the center axes of the two legs of which intersect at the position of the center of gravity of the reflecting mirror along its optical axis; and a parallel-spring member for enabling elastically translational displacement of the bipod along the optical axis of the reflecting mirror; in which the mirror-mounting portion of the bipod is elastically rotatable about the lateral X axis by first and second spring elements formed by providing grooves in each of the two legs of the bipod, and is elastically rotatable about the lateral Y axis by a third spring element formed by providing in each of the two legs grooves parallel to the lateral Y axis.

[Effects of the Invention]

According to the invention described in claims 1 through 3, because a bipod is provided so that the center axes of the two legs intersect at the position of the center of gravity of the reflecting mirror along its optical axis, it is not necessary to provide supporting-mechanism fixing holes, and with bearing force acting on the position of the center of gravity of the reflecting mirror, moment load due to displacement from the reflecting-mirror gravity center position is prevented from arising, whereby the reflecting mirror is supported while maintaining the high mirror accuracy of the reflecting mirror.

BRIEF DESCRIPTION OF DRAWINGS

FIG. 5 is a configuration diagram illustrating the configuration of a reflecting-mirror positioning mechanism relevant to Embodiment 3 of the present invention.

DESCRIPTION OF THE SYMBOLS

Figure 1:
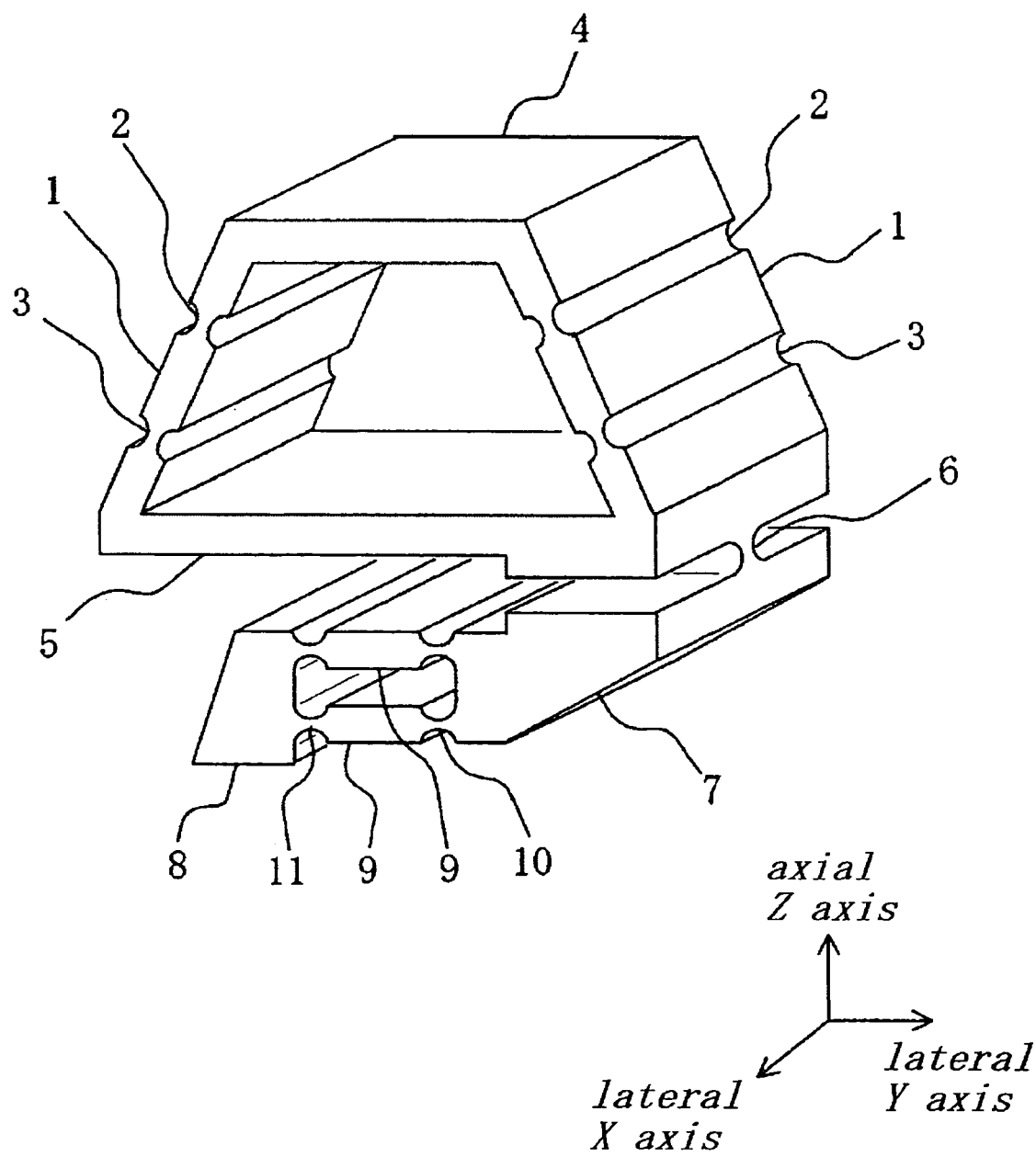
FIG. 1 is a perspective view illustrating the structure of a reflecting-mirror supporting mechanism relevant to Embodiment 1 of the present invention.

1: bipod
2: first spring elements
3: second spring elements
4: mirror-mounting portion
6: spring member
9: parallel-spring member
17: third spring elements

BEST MODE FOR CARRYING OUT THE INVENTION

Embodiment 1

A reflecting-mirror supporting mechanism relevant to Embodiment 1 of the present invention will be described according to FIG. 1 and FIG. 2. FIG. 1 is a perspective view illustrating the structure of the reflecting-mirror supporting mechanism relevant to Embodiment 1 of the present invention. In FIG. 1, numeral 1 denotes a bipod composed of two right and left legs, numeral 2 denotes first spring elements formed in the upper portions of the bipod 1, and numeral 3 denotes second spring elements formed in the lower portions of the bipod 1. The first spring elements 2 and the second spring elements 3 are formed by symmetrically providing grooves from both faces of plate material forming the bipod 1 toward the center axes of the plate material. Numeral 4 denotes a mirror-mounting portion for uniting upper ends of the two legs of the bipod 1 and for mounting a reflecting mirror, and numeral 5 denotes a bipod base for uniting lower ends of the two legs of the bipod 1. Numeral 6 denotes a spring member formed in the bottom of the bipod base, and numeral 7 denotes an intermediate member combined with the lower end of the spring member 6. Numeral 8 denotes an attachment base, and numeral 9 denotes a parallel-spring member composed of two parallel members. In the parallel-spring member 9, numeral 10 denotes spring elements formed on the side of the intermediate member 7, and numeral 11 denotes spring elements formed on the side of the attachment base 8.

The two right and left legs forming the bipod 1 are arranged with their upper ends getting close to each other, at a tilt with respect to the axial Z axis illustrated in FIG. 1. The upper ends of the two legs are united by the mirror-mounting portion 4 with a predetermined distance. The first spring elements 2 and the second springs 3 are thin-walled portions that are so formed that, on both the faces of the plate material of the bipod 1, the grooves parallel to the lateral X axis illustrated in FIG. 1 are provided. The portions of the first spring elements 2 and the second spring elements 3 are easier to bend than the other portions of the bipod 1, and have rotationally elastic property about the lateral X axis. By the first spring element 2 and the second spring element 3 formed in each of the two right and left legs of the bipod 1 as described above, the mirror-mounting portion 4 is elastically rotatable with respect to the bipod base 5 about the lateral X axis. In addition, as illustrated in FIG. 1, a thin-walled portion is formed by providing grooves between the bipod base 5 and the intermediate member 7, to form the spring member 6. By the spring member 6, the bipod base 5 is elastically rotatable with respect to the intermediate member 7 about the lateral Y axis illustrated in FIG. 1. The intermediate member 7 and the attachment base 8 are united by the parallel-spring member 9, so that the intermediate member 7 can be elastically translationally displaced along the axial Z axis with respect to the attachment base 8. In the parallel-spring member 9, in the intermediate member 7 side, grooves are provided on both sides of the plate materials to form the spring elements 10, and in the attachment base 8 side, grooves are provided on both sides of the plate materials to form the spring elements 11. By the spring elements 10 and the spring elements 11, the parallel-spring member 9 can be elastically deformed.

As described above, in the reflecting-mirror supporting mechanism relevant to the invention, the mirror-mounting portion 4 is arranged with three degrees of freedom with respect to the attachment base 8, which are elastically translational displacement along the axial Z axis, elastic rotation about the lateral Y axis, and elastic rotation about the lateral X axis. Moreover, it is another feature of the present invention that the first spring elements 2, the second spring elements 3, the spring member 6, and the parallel-spring member 9 (including the spring elements 10 and the spring elements 11) are formed as a single unit by carving or molding each element or member from the base material, whereby the number of components is small, so that generation of backlash elements in the mechanism can be reduced. Furthermore, the above-described spring elements and the spring members can be replaced with discrete spring components such as blade springs.

Figure 2:
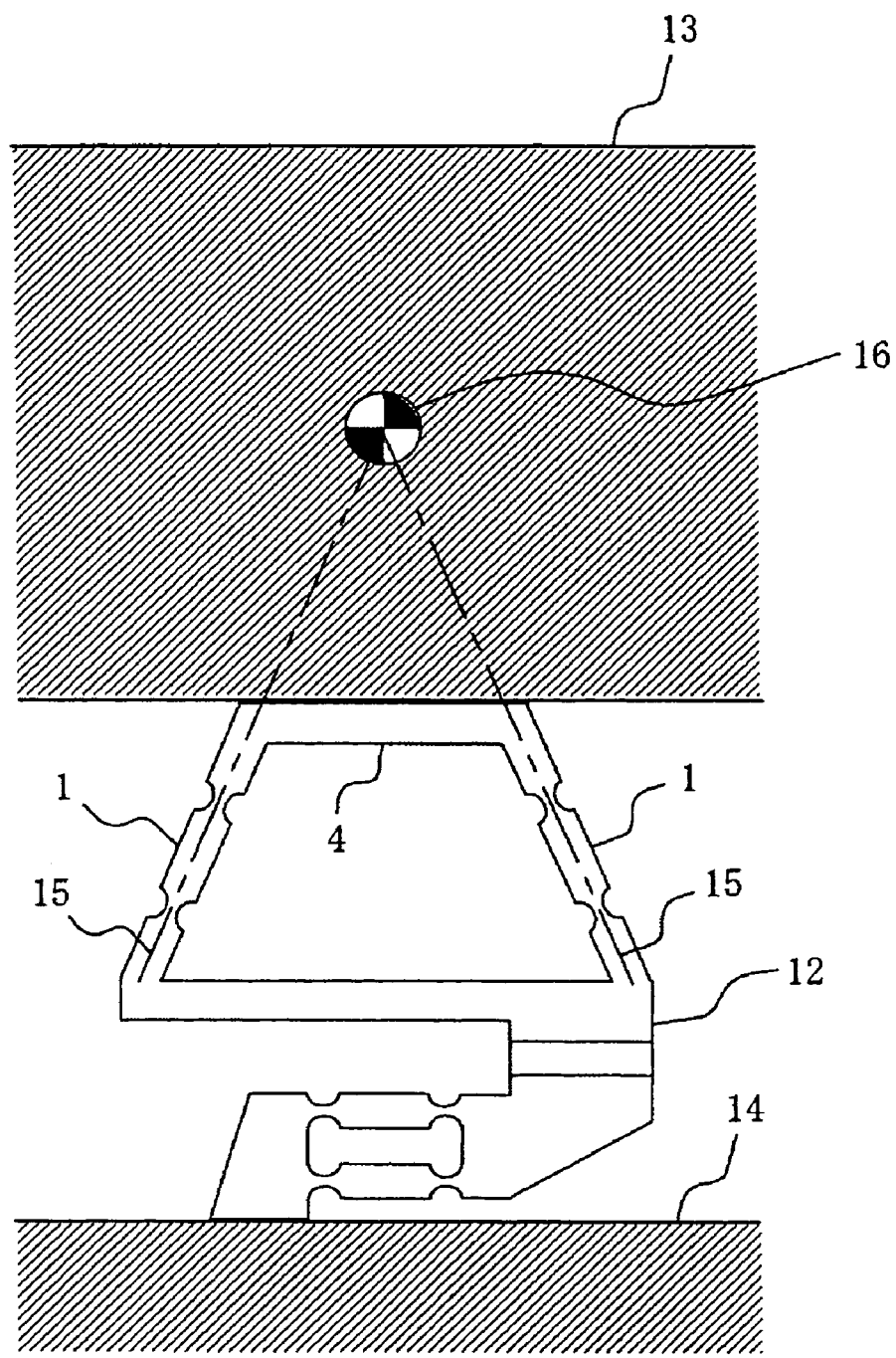
FIG. 2 is a front view illustrating a state in which the reflecting-mirror supporting mechanism relevant to Embodiment 1 of the present invention is fixed to a reflecting mirror and a mirror cell.

FIG. 2 is a front view illustrating a state in which the reflecting-mirror supporting mechanism relevant to Embodiment 1 of the invention is fixed to a reflecting mirror and a mirror cell. FIG. 2 is a view viewed from the lateral X axis direction illustrated in FIG. 1. In FIG. 2, numeral 12 denotes the reflecting-mirror supporting mechanism, and numeral 13 denotes the reflecting mirror. Numeral 14 denotes the mirror cell that is provided in the back side of the reflecting mirror to structurally support the reflecting mirror, and is also called a back structure. Numeral 15 denotes the center axes of the two legs of the bipod 1, and numeral 16 denotes the position of the center of gravity of the reflecting mirror 13 along the axial Z axis.

The two legs of the bipod 1 are arranged with their upper ends getting close to each other with a predetermined distance at a tilt with respect to the axial Z axis, so that the intersecting point of the center axes 15 is located above the mirror-mounting portion 4. The tilt and the distance between the upper ends, of the bipod 1, are determined so that the intersecting point of the center axes agrees with the gravity center position 16 of the reflecting mirror 13 along the axial Z axis. The center axes 15 intersect at the gravity center position 16 of the reflecting mirror 13 as described above, whereby lines of action of axial forces applied to the two legs of the bipod 1 pass through the gravity center position 16 of the reflecting mirror 13, so that moment load can be prevented from arising in the reflecting mirror 13. Therefore, even if the reflecting mirror 13 rotates about the lateral X axis (an axis perpendicular to the paper face in FIG. 2) to change its bearing, no moment is generated about the gravity center position 16 of the reflecting mirror 13 along the axial Z axis, so that variations in the internally generated moment associated with such a. bearing change is suppressed, and the surface accuracy of the reflecting mirror 13 can be maintained in a high accuracy.

Embodiment 2

Figure 3:
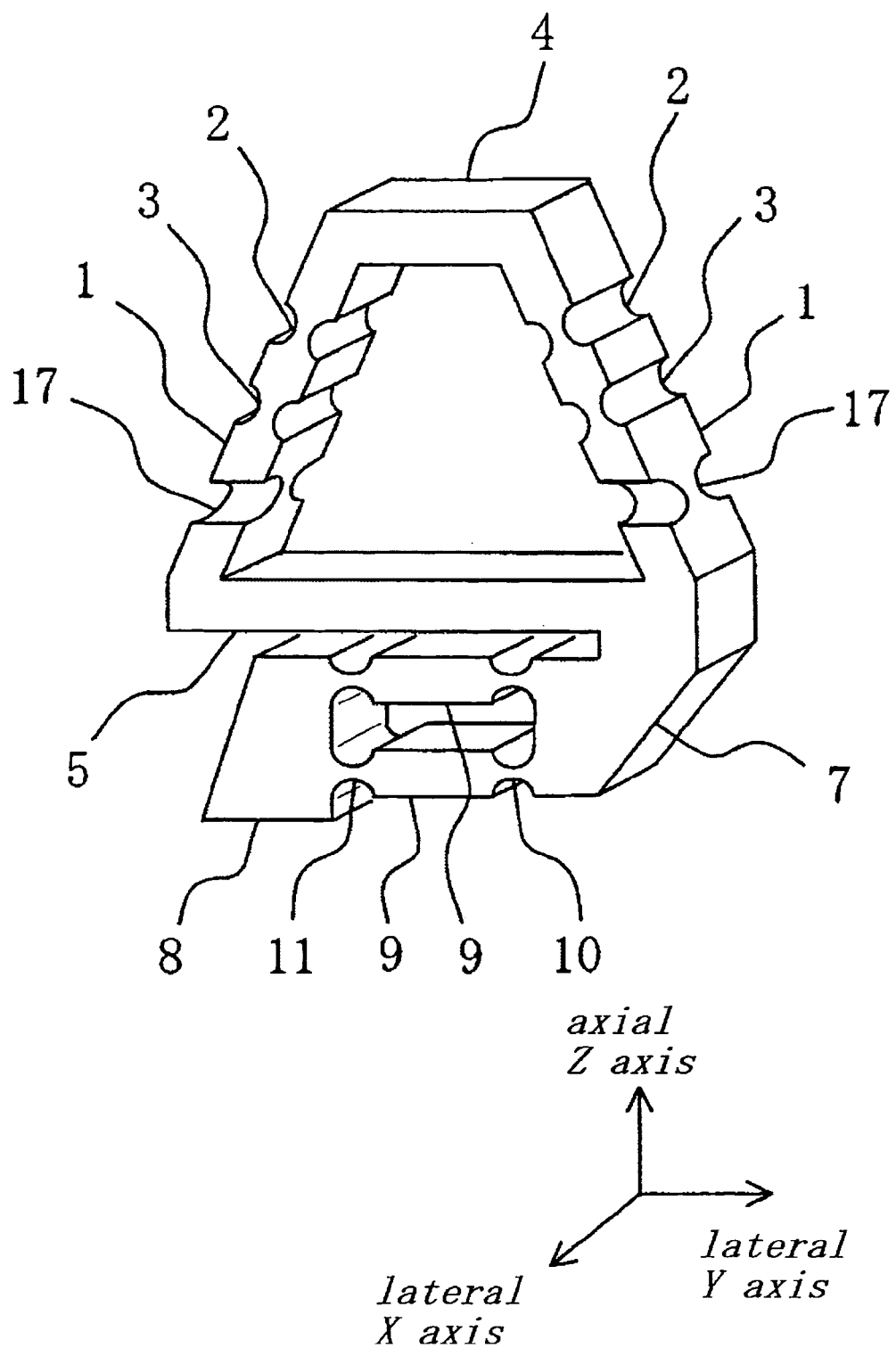
FIG. 3 is a perspective view illustrating the structure of a reflecting-mirror supporting mechanism relevant to Embodiment 2 of the present invention.

A reflecting-mirror supporting mechanism relevant to Embodiment 2 of the present invention will be described according to FIG. 3 and FIG. 4. FIG. 3 is a perspective view illustrating the structure of the reflecting-mirror supporting mechanism relevant to Embodiment 2 of the present invention. In FIG. 3, numeral 17 denotes third spring elements formed in the two right and left legs of the bipod 1. Here in FIG. 3, components and portions with the same numerals as in FIG. 1 are the same as or corresponding to components and portions in FIG. 1.

In FIG. 3, the third spring elements 17 are formed by symmetrically providing grooves from both faces of plate material of the bipod 1 toward the center lines of the plate material. The grooves in the third spring elements 17 are provided parallel to the lateral Y axis, and thin-walled portions formed by the grooves serve as the third spring elements 17. The portions of the third spring elements 17 are easier to bend than the other portions of the bipod 1, and have rotationally elastic property about the lateral Y axis illustrated in FIG. 3. In addition, in FIG. 3, the third spring elements 17 are provided below the first spring elements 2 and the second spring elements 3. However, the third spring elements can be provided above the first spring elements 2 and the second spring elements 3, or between the first spring elements 2 and the second spring elements 3.

As described above, in the reflecting-mirror supporting mechanism relevant to Embodiment 2 of the invention, the mirror-mounting portion 4 is arranged with three degrees of freedom with respect to the attachment base 8, which are elastically translational displacement along the axial Z axis by the parallel-spring member 9, elastic rotation about the lateral Y axis by the third spring elements 17, and elastic rotation about the lateral X axis by the first spring elements 2 and the second spring elements 3. Moreover, it is another feature of the present invention that the first spring elements 2, the second spring elements 3, the third spring elements 17, and the parallel-spring member 9 (including the grooves 10 and the grooves 11) are formed as a single unit by carving or molding each element or member from its base material, whereby the number of components is small, so that generation of backlash elements in the mechanism can be reduced. Furthermore, the above-described spring elements and the spring member can be replaced with discrete spring components such as blade springs.

Figure 4:
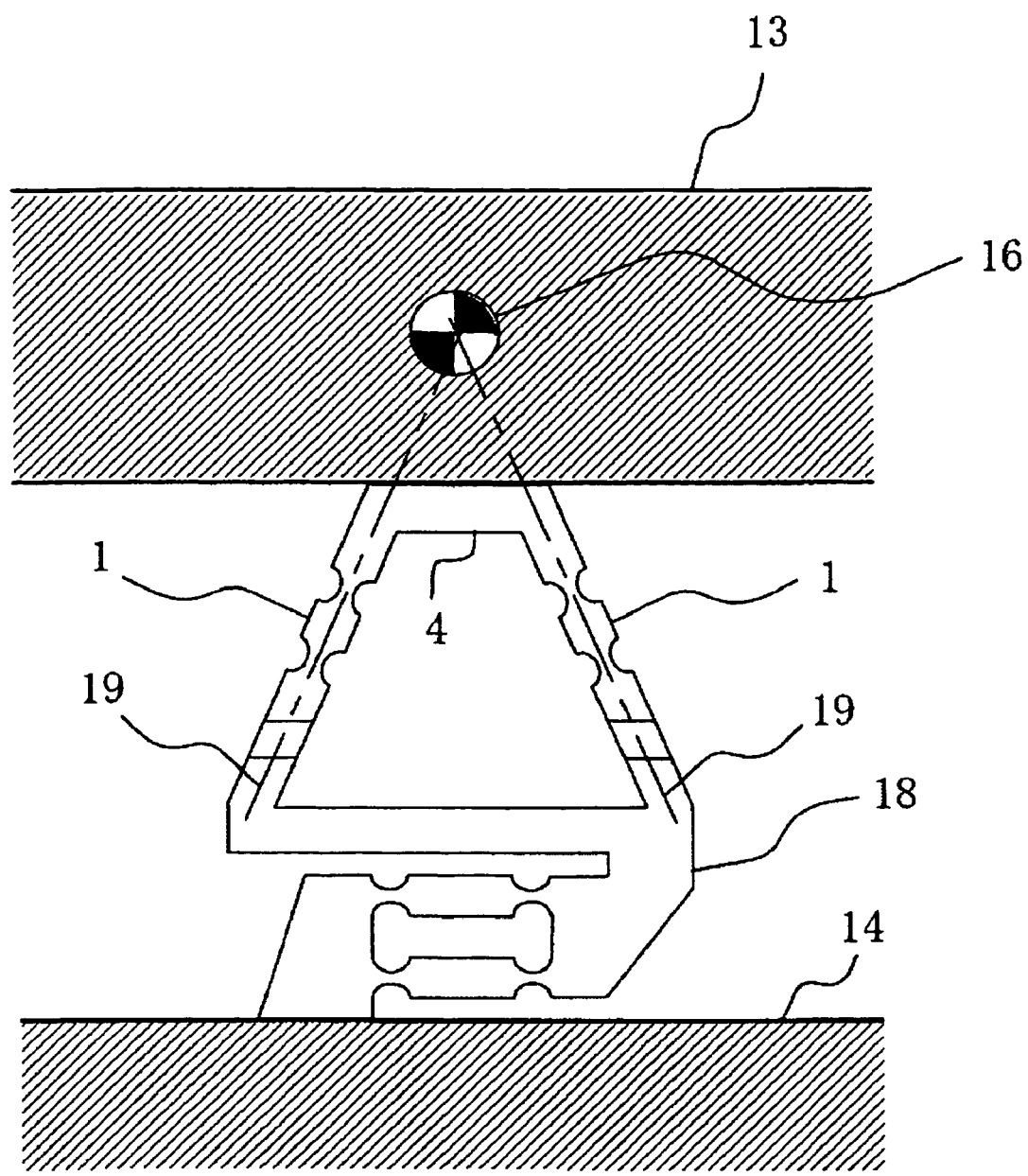
FIG. 4 is a front view illustrating a state in which the reflecting-mirror supporting mechanism relevant to Embodiment 2 of the present invention is fixed to a reflecting mirror and a mirror cell.
Figure 4:
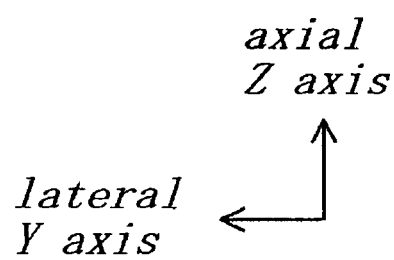

FIG. 4 is a front view illustrating a state in which the reflecting-mirror supporting mechanism relevant to Embodiment 2 of the invention is fixed to a reflecting mirror and a mirror cell. FIG. 4 is a view viewed from the lateral X axis direction illustrated in FIG. 3. In FIG. 4, numeral 18 denotes the reflecting-mirror supporting mechanism, and numeral 19 denotes the center axes of the two legs of the bipod 1. Here in FIG. 4, components and portions with the same numerals as in FIG. 2 are the same as or corresponding to those in FIG. 2.

The two legs of the bipod 1 are arranged with their upper ends getting close to each other with a predetermined distance at a tilt with respect to the axial Z axis, so that the intersecting point of the center axes 19 is located above the mirror-mounting portion 4. The tilt and the distance of the upper ends, of the bipod 1, are determined so that the intersecting point of the center axes 19 agrees with the gravity center position 16 of the reflecting mirror 13 along the axial Z axis. The center axes 19 intersect at the gravity center position 16 of the reflecting mirror 13 as described above, whereby lines of action of axial forces applied to the two legs of the bipod 1 pass through the gravity center position 16 of the reflecting mirror 13, so that moment load can be prevented from arising in the reflecting mirror 13. Therefore, even if the reflecting mirror 13 rotates about the lateral X axis (an axis perpendicular to the paper face in FIG. 4) to change its bearing, no moment is generated about the gravity center position 16 of the reflecting mirror 13 along the axial Z axis, so that variations in the internally generated moment associated with such a bearing change is suppressed, and the surface accuracy of the reflecting mirror 13 can be maintained in a high accuracy.

Embodiment 3

A reflecting-mirror positioning mechanism relevant to Embodiment 3 of the present invention will be described according to FIG. 5. FIG. 5 is a configuration diagram illustrating the configuration of the reflecting-mirror positioning mechanism relevant to Embodiment 3 of the invention. In FIG. 5, numeral 20 denotes actuators, which are provided on the mirror cell 14, and which translationally drive the reflecting mirror 13 along the axial Z axis. In FIG. 5, components and portions with the same numerals as in FIG. 2 are the same as or corresponding to those in FIG. 2. In addition, although the reflecting-mirror supporting mechanism 12 explained in Embodiment 1 is illustrated in FIG. 5, a reflecting-mirror supporting mechanism 18 explained in Embodiment 2 can be substituted for the reflecting-mirror supporting mechanism 12.

The actuators 20 include translation mechanisms, and can push and pull the reflecting mirror 13 along the axial Z axis. Because the mirror-mounting portion 4 in the reflecting-mirror supporting mechanism 12 can be elastically translationally displaced along the axial Z axis with respect to the attachment base 8, by providing the actuators 20 on the sides of the reflecting-mirror supporting mechanism 12 to translationally drive the mirror-mounting portion, the position of the reflecting mirror 13 along the axial Z axis with respect to the mirror cell 14 can be controlled. Because the mirror-mounting portion 4 in the reflecting-mirror supporting mechanism 12 is elastically rotatable about the lateral X axis with respect to the attachment base 8, by controlling the translation mechanisms in the actuators 20 provided on the right and left sides of the reflecting-mirror supporting mechanism 12, the reflecting mirror 13 can be controlled to rotate about the lateral X axis with respect to the mirror cell 14. In the same manner, because the mirror-mounting portion 4 in the reflecting-mirror supporting mechanism 12 is elastically rotatable about the lateral Y axis with respect to the attachment base 8, by disposing actuators 20 in the perpendicular direction with respect to the paper face in FIG. 5 to perform driving control, the reflecting mirror 13 can be controlled to rotate about the lateral X axis with respect to the mirror cell 14. Alternatively, three actuators 20 can be arranged, each being spaced 120 degrees apart, rotationally symmetrically about the reflecting-mirror supporting mechanism 12, to control the rotation about the lateral X axis, the rotation about the lateral Y axis, and the displacement along the axial Z axis.

INDUSTRIAL APPLICABILITY

The present invention can be applied to a reflecting-mirror supporting mechanism and a reflecting-mirror positioning mechanism, used for optical or radio telescope systems with a reflecting mirror, or communication antenna systems with a reflecting mirror for communications.

What is claimed is:

1. A reflecting-mirror supporting mechanism comprising:
    a bipod whose mirror-mounting portion onto which a reflecting mirror is mounted rotates elastically about the lateral X axis, and the center axes of the two legs of which intersect at the position of the center of gravity of the reflecting mirror along its optical axis;
    a spring member for enabling elastic rotation of the bipod about the lateral Y axis; and
    a parallel-spring member for enabling elastically translational displacement of the bipod along the optical axis of the reflecting mirror.

2. A reflecting-mirror supporting mechanism according to claim 1, wherein each of the two legs of the bipod includes a first spring element and a second spring element, formed by providing grooves in each leg.

3. A reflecting-mirror supporting mechanism comprising:
    a bipod whose mirror-mounting portion onto which a reflecting mirror is mounted rotates elastically about the lateral X axis and about the lateral Y axis, and the center axes of the two legs of which intersect at the position of the center of gravity of the reflecting mirror along its optical axis; and
    a parallel-spring member for enabling elastically translational displacement of the bipod along the optical axis of the reflecting mirror;
    wherein the mirror-mounting portion of the bipod is elastically rotatable about the lateral X axis by first and second spring elements formed by providing grooves in each of the two legs of the bipod, and is elastically rotatable about the lateral Y axis by a third spring element formed by providing in each of the two legs grooves parallel to the lateral Y axis.

* * * * *